(12) United States Patent
Reichardt et al.

(10) Patent No.: US 6,234,391 B1
(45) Date of Patent: May 22, 2001

(54) SMART CARD READER

(75) Inventors: Manfred Reichardt, Weinsberg; Bernd Schuder, Schwaigern, both of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/217,618

(22) Filed: Dec. 22, 1998

(30) Foreign Application Priority Data

Dec. 23, 1997 (DE) .............................................. 197 57 626

(51) Int. Cl.⁷ ....................................................... G06K 5/00
(52) U.S. Cl. ............................................. 235/441; 235/380
(58) Field of Search ..................................... 235/441, 380

(56) References Cited

U.S. PATENT DOCUMENTS

| | | | |
|---|---|---|---|
| 4,623,207 | 11/1986 | Sasaki et al. | 339/17 |
| 5,370,544 | * 12/1994 | Reichardt et al. | 439/188 |
| 5,726,432 | * 3/1998 | Reichardt | 235/441 |

FOREIGN PATENT DOCUMENTS

| | | | |
|---|---|---|---|
| 94 18 193 U | 1/1969 | (DE) . | |
| 39 31 501 A1 | 4/1990 | (DE) . | |
| 195 21 728 | 12/1996 | (DE) . | |
| 196 24 079 | 1/1998 | (DE) . | |
| 0 542 231 | 11/1992 | (EP) . | |
| 0 845 750 | 6/1998 | (EP) . | |
| 2 298 743 | 9/1996 | (GB) . | |
| 0259195 | * 11/1987 | (JP) | 235/441 |
| 0269191 | * 10/1989 | (JP) | 235/441 |
| WO 97/32275 | 9/1997 | (WO) . | |

* cited by examiner

Primary Examiner—Mark Tremblay
(74) Attorney, Agent, or Firm—Blank Rome Comisky & McCauley, LLP

(57) ABSTRACT

A smart-card reader that includes a base, a first group of contact elements, a cover, a second group of contact elements and connecting means is disclosed. The smart-card reader can be readily soldered into a printed circuit board of a customer to be used in an apparatus in which the smart card reader is located.

5 Claims, 4 Drawing Sheets

SMART CARD READER

BACKGROUND OF THE INVENTION

I. Field of the Invention

The invention relates to a smart-card reader and in particular to a smart-card reader which is useful for different applications.

II. Description of the Related Art

DE-39 31 501 A1 discloses a smart card or chip card reader, i.e. a contacting apparatus comprising a contact element support or frame within which contact elements are fixedly mounted. A cover can be mounted on said contact element support, so as to form together with said frame an insert slot into which a smart card can be inserted into a card reading position. The cover is not required if a surface is provided by the apparatus in which the smart-card reader is used, a surface which assumes the function of the cover. In the card reading position the contact elements of the smart-card reader, which are also sometimes called reading contact elements, engage or contact so-called card contacts which are formed on at least one surface of said smart card. When a smart card is inserted into its reading position in the smart-card reader, then information stored in a chip located in the smart card can be read-out.

Smart card readers can be installed into certain apparatuses, for instance a television set so as to be used together with a smart card for the control of the operation of such an apparatus.

If different applications or usages are to be provided by an apparatus, for instance by a television set, then it is presently the common practice to assign to each of the applications or usages a dedicated smart-card reader. That is, a separate smart-card readers with smart card receiving means are provided for each card.

It is an object of the present invention to provide a smart-card reader which allows its use for at least two applications or usages for the apparatus in which the smart-card reader is installed. Thus, space in the apparatus in which the smart-card reader is used, is saved, and the cost of installing readers is reduced.

It is another object of the invention to allow for a less expensive production of a smart-card reader.

In accordance with another object of the invention a smart-card reader is provided which can be readily soldered into a printed circuit board of a customer to be used in an apparatus in which the smart card reader is to be based.

It is a still further object of the invention to provide a duplex smart-card reader into which smart cards can be inserted with at least two different orientations.

SUMMARY OF THE INVENTION

In accordance with the present invention a smart-card reader comprises a base portion or base, a first group of contact elements fixedly mounted in said base portion, a cover portion or cover placed on top of said base portion and a second group of contact elements fixedly mounted in said cover portion.

In accordance with another embodiment of the invention the contact elements of each of said groups of contact elements comprise a termination end or portion adapted to be connected to an electrical circuit and a contacting end adapted to contact one of the card contacts formed by said smart card, and wherein the contacting ends of both groups face towards each other.

In accordance with a further embodiment of the invention the base is fixed to the cover forming a card receiving or card insert slot in the area in which said contacting ends face each other. A smart card is adapted to be selectively inserted into said insert slot for contacting either the contact elements mounted in the cover and/or the contact elements mounted in the base.

In accordance with another embodiment of the invention connecting means are provided for the termination ends or portions of the contact elements either in the cover or in the base Preferably, the termination ends of the contact elements in the cover are extended by said connecting means to a level of the termination ends of the contact elements in the base.

In a further embodiment of the invention the connecting means comprises a printed circuit board having a front end and a rear end and extending from a front end of the cover to a rear end of the cover and beyond said rear end of the cover forming an overhanging portion. The termination ends of the contact elements of the first group extend upwardly from an upper surface of the cover, while the termination ends of the contact elements of the second group extend downwardly from a bottom surface of the base. The upwardly extending termination ends of the contact elements in the cover are connected to conductive paths of said printed circuit board Said conductive paths lead to the rear end of the printed circuit board, i.e. the overhanging portion in which pins are provided which are connected with their one ends to said conductive paths and extend downwardly with their other ends to the level of the termination ends of the contact elements in the base.

In accordance with a further embodiment of the invention an end position switch is located in the cover or the base, preferably in the cover. Said end position switch comprises two contact elements fixedly mounted in the base or cover.

In accordance with another embodiment of the invention a smart-card reader is provided which comprises a base with contact elements having termination ends forming soldering contacts adapted to be soldered into a printed circuit board and projecting away from the bottom surface of said base. The bottom surface is opposite to an upper surface of the base adjacent to which the contacting ends or portions of the contact elements are located. The smart-card reader further comprises a cover in substance similar to said base and also carrying contact elements with termination ends forming soldering contacts and projecting away from an upper surface of the cover which is opposite to a bottom surface of the cover adjacent to which the contacting ends or portions of the contact elements are located. The cover is placed on the base such that the bottom surface of the cover and the upper surface of the base (close to which the contacting ends of the contact elements are located) face towards each other thus forming said card insert slot.

Means are provided to connect the termination ends of all the contact elements including the contact elements forming the end position switch such that the entire smart-card reader can be readily connected with a customer circuit board. Said connecting means electrically connect all contact element termination ends of said first or said second group, such that all terminations of said contact elements are one side of the smart-card reader.

Generally speaking, any kind of galvanic connection can be provided between the contact elements in the cover and/or base, so that they can be readily connected to the customer circuit board. Instead of connecting means in the form of a rigid circuit board with a pin arrangement as described, also a polyflex connection can be provided between the contact elements in the cover and the customer circuit board.

BRIEF DESCRIPTIONS OF THE DRAWIGS

The features, objects, and advantages of the invention will become more apparent from the detailed description set forth below when taken in conjunction with the drawings, wherein:

FIG. 5 is a top plan view of a customer circuit board into which the smart-card reader of the invention can be soldered.

Figure 1:
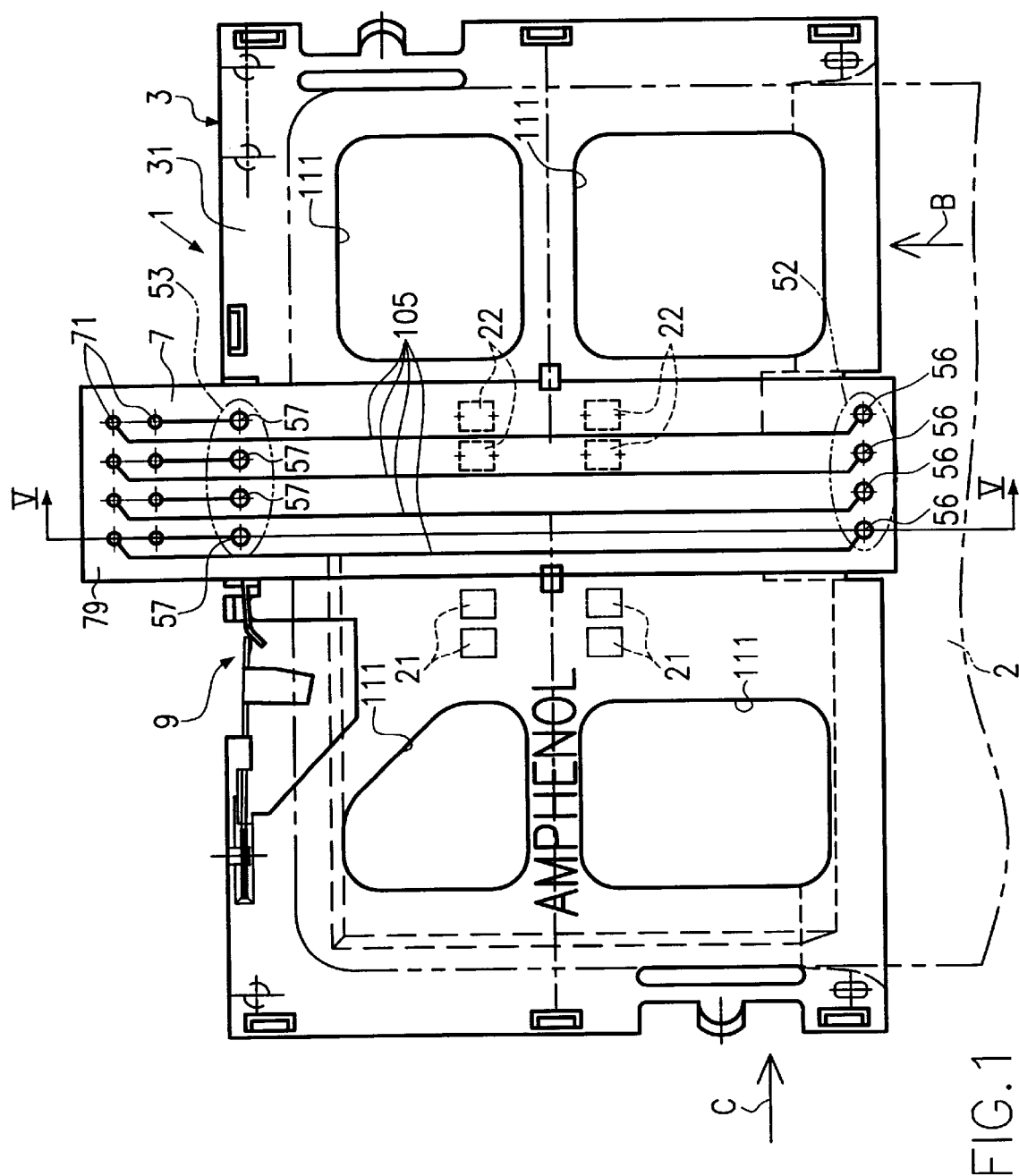
FIG. 1 is a top plan view of a smart-card reader of an embodiment of the invention.

FIGS. 1, 2, 3 and 4 show the smart-card reader 1 in accordance with the invention In FIG. 1 a smart card 2 is shown schematically as being inserted into said chip-card reader 1 in the direction of arrow B (FIG. 1)

Figure 2:
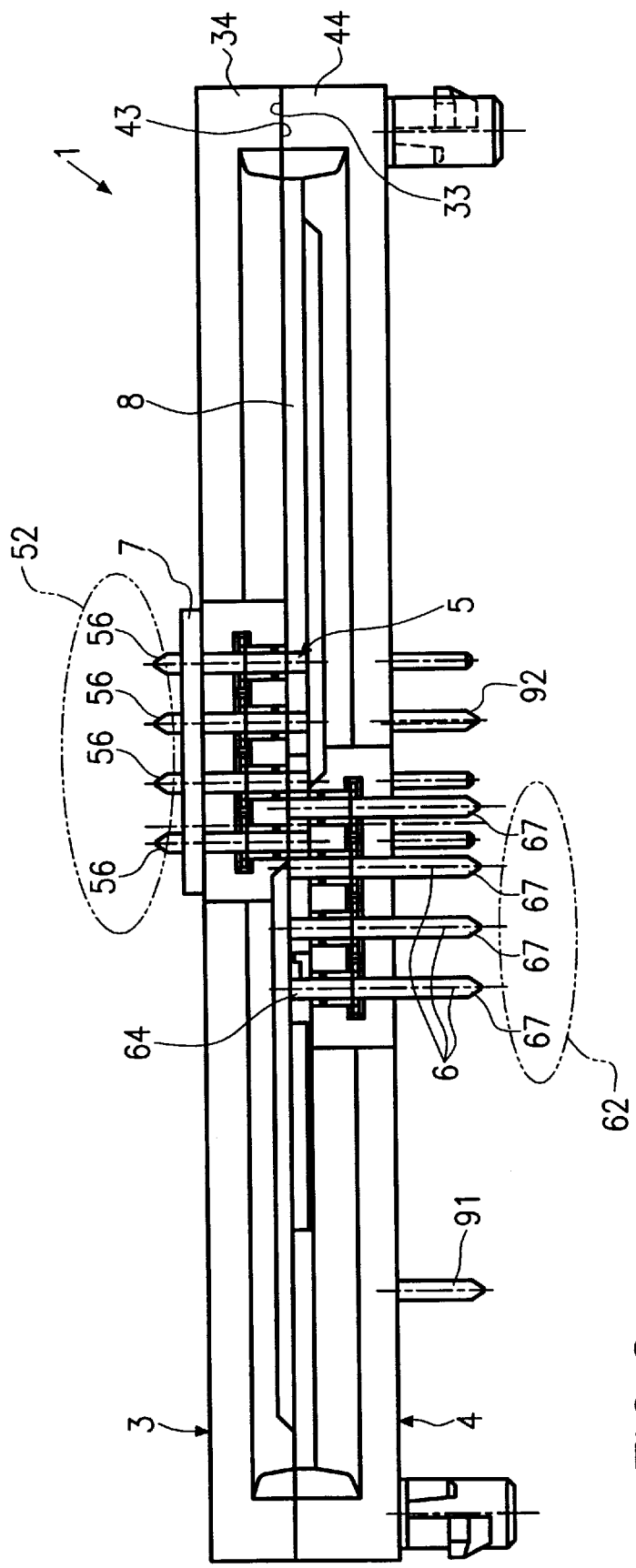
FIG. 2 is an elevational view of the smart-card reader of FIG. 1 from the direction of arrow B in FIG. 1.

FIG. 2 shows that the smart-card reader 1 comprises a first or upper portion 3 and a second or lower portion 4. The upper portion 3 will be called below a cover 3 and the lower portion 4 will be called below a base 4. Preferably, the cover 3 is identical or very similar to the base 4 and is just turned by 180° and placed on top of the base 4.

FIGS. 2 and 5 show a first group of two times four, i.e. eight reading contact elements 5, 55 is fixedly mounted in the cover 3. In FIG. 2 the contact elements 55 are behind (left in FIG. 4) the contact elements S. Similarly, in the base 4 there are also eight contact elements 6, 66 fixedly mounted forming a second group of contact elements. The contact elements of each group are arranged in two sub groups of each four contact elements.

Figure 4:
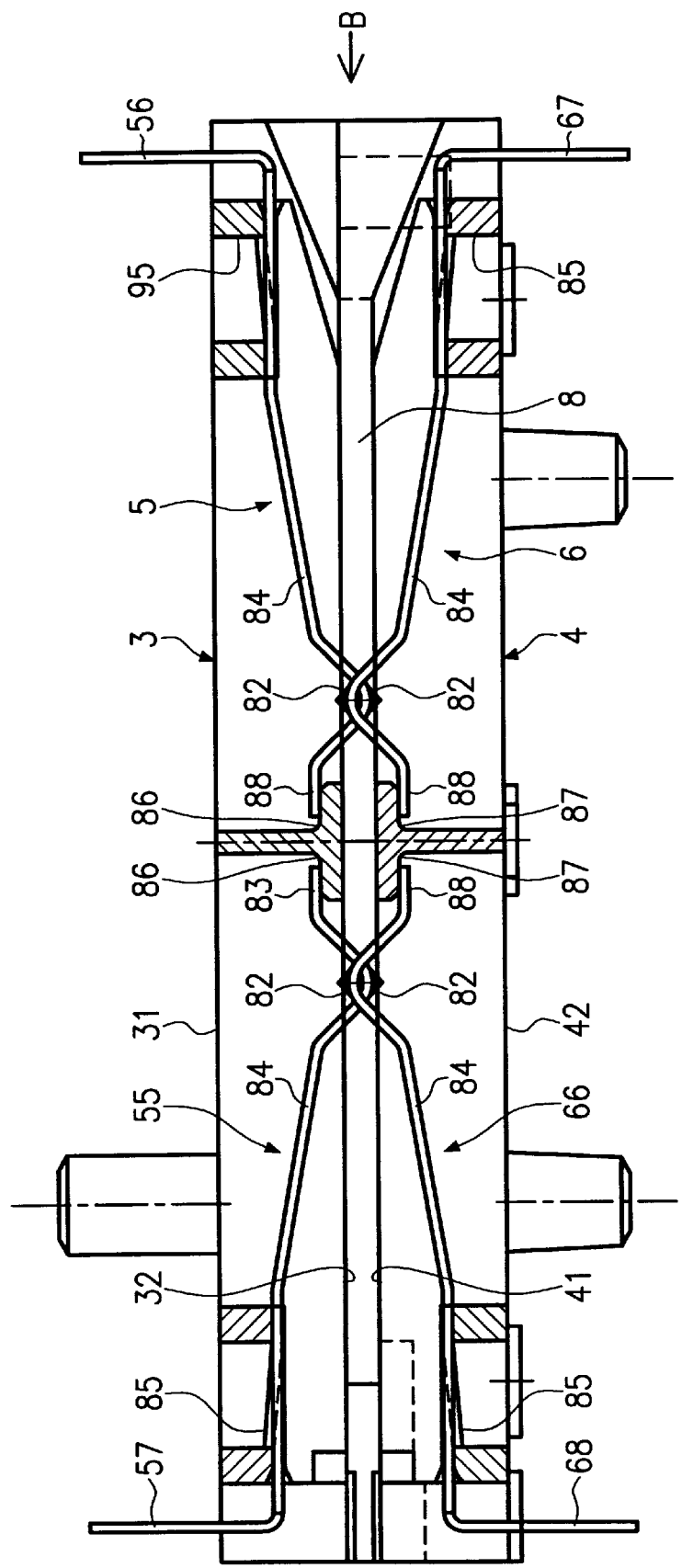
FIG. 4 is a schematic cross sectional view in substance along line V—V in FIG. 1, however, with the circuit board being deleted.

For instance FIG. 4 shows each of the identical contact elements 5, 55; 6, 66 as comprising a termination end or portion 56, 57; 67, 68 which is angled by about 90° with respect to a substantially longitudinal portion 84. The longitudinal portion 84 forms a contacting portion or end in the form of a cusp 82. The cusp 82 continues and ends in an abutment portion 88 which can abut at an abutment surface 86, 87 formed by said cover and base, respectively. The contact element forms detent means in the form of a snap arm 85 stamped out of the material of the contact element. Said snap arm 84 co-operates with respective detent means of the base and cover, respectively, for instance with a snap in surface 95 shown in FIG. 4 for the contact element 5.

Of the first group of contact elements 5, 55 termination ends 56, 57 are bent upwardly (FIGS. 2 and 4). The contact elements 5, of which the termination ends 56 are shown, from a first sub group 52 and the contact elements 55 of which the termination ends 57 are shown from a second sub group 53 of the first group (FIG. 1).

Of the second group of contact elements 6, 66 the termination ends 67, 68 are bent downwardly (FIGS. 2 and 4). The contact elements 6 of which the termination ends 67 are shown from a first sub group 62 (FIG. 2) and the contact elements 66 of which the termination ends 68 are shown form a second sub group 63 of the second group of contact elements.

Figure 3:
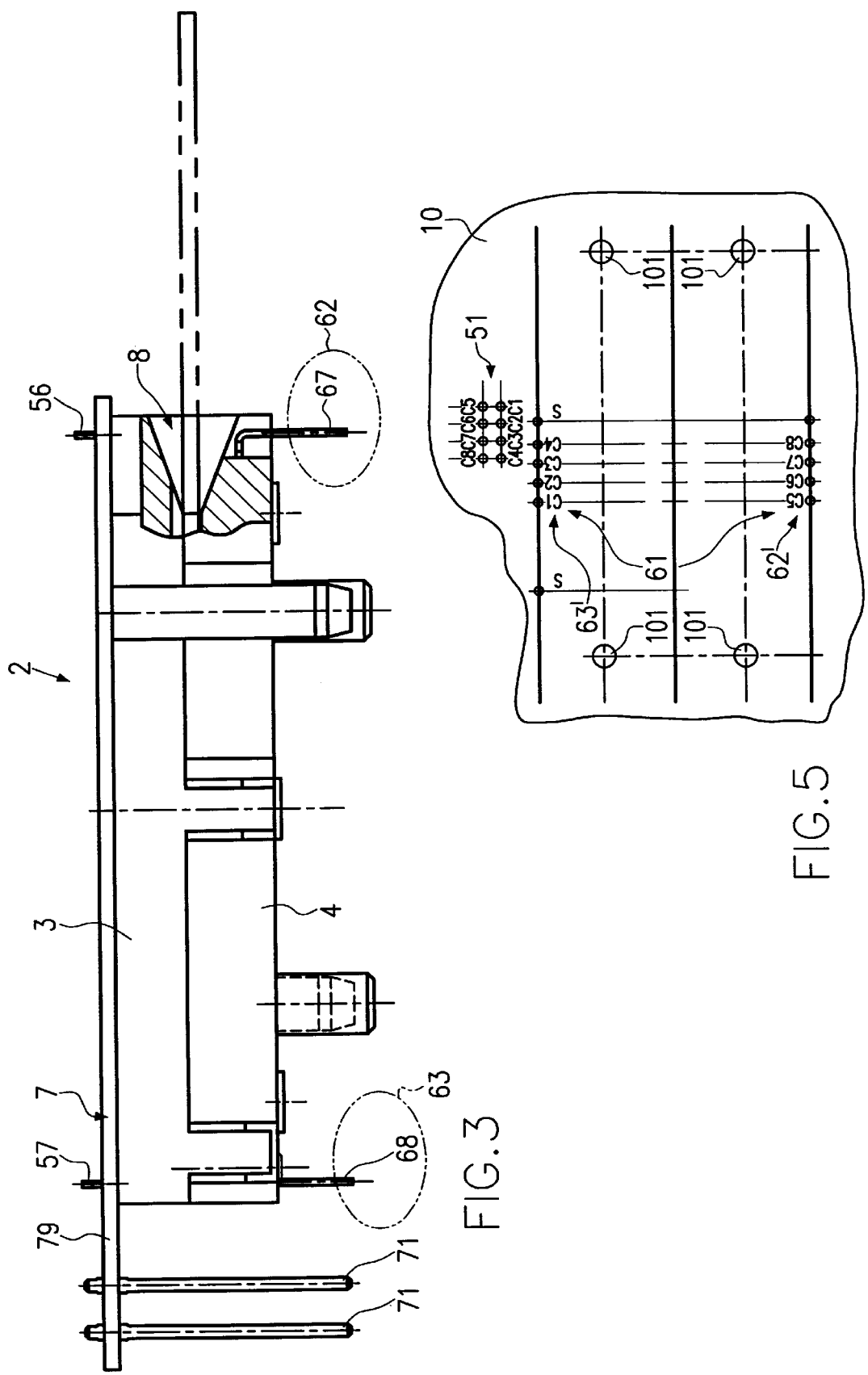
FIG. 3 is a side elevational view of the smart-card reader of FIG. 1 from the direction of arrow C in FIG. 1.

A connecting means 7 in the form of a printed circuit board having a front end and a rear end extends from a front end of the cover 3 to a rear end of the cover 3 and beyond the rear end of the cover 3 forming an overhanging portion 79 (FIG. 3).

The termination ends 56, 57 of the contact elements of the first group extend upwardly, while the termination ends 67, 68 of the contact elements of the second group extend downwardly. The upwardly extending termination ends 56, 57 of the contact elements are connected to conductive paths 105 of the printed circuit board 7. Said conductive paths 105 lead to the overhang portion 79 which extends beyond said cover portion rear end. There, pins 71 are connected to said conductive paths 105 and extend downwardly to the level of the termination ends 67, 68 of the contact elements 6, 66 of the base 4. Thus, the termination of all the contact elements (including the contact elements of an end position switch if present) end at substantially the same level so that they all can be soldered at the same time into a customer circuit board 10 shown in FIG. 5.

FIG. 5 discloses a top plan view of the customer circuit board 10 wit-out a smart card reader yet being mounted thereon. Pins 71 in the overhanging portion 79 of the circuit board 7 are adapted to be inserted into holes C1 through C8 of the customer circuit board 10. This group of holes C1 through C8 is referred to by reference numeral 51 in FIG. 5. Thus, the first group of contact elements 5, 55 are connected to the circuit board 10.

The termination ends of the contact elements 6, 61 mounted in the base 4 extend downwardly like the soldering pins 71 in FIGS. 1 and 2 and are adapted to extend through the hales of a group of holes 61. Group 61 forms sub groups 62' and 63' as shown in FIG. 5 corresponding to the sub groups 62, 63 of the contact elements 6, 66. Into the holes 101 of the customer circuit board 10 respective mounting pins 106 of the base 4 can be inserted as is shown in FIG. 5 to fixedly mount the base 4 on board 10.

The cover 3 has an upper surface 31 and a lower surface 32 beyond which the cusps 82 of the contact elements 5, 55 extend. The base 4 has an upper surface 41 and a lower surface 42. The cusps 82 of the contact elements 6, 66 in the base 4 extend beyond said upper surface 41. The lower surface 32 and the upper surface 41 form a card insert slot 8.

Both the cover and the base (see FIG. 2) have U-shaped side walls 34 and 44, respectively forming U-shaped surfaces 33, 43 which face towards each other and are preferably adhesively bonded together.

FIG. 1 shows an end position switch having two contact elements located in the base 4.

Both the cover and base have cut out portions 111 as is shown in FIG. 1.

In FIG. 1 reference numerals 21 and 22 refer to each one smart card contact out of two groups of card contacts of the smart card 2. These contacts 21, 22 can actually not be seen in the situation of FIG. 1. A smart card has typically its card contacts (like 21 or 22) on only one surface. If such a smart card is assumed to have been inserted in FIG. 1, then e.g. the card contacts 21 face upwardly, if the card is turned by 180° then the card contacts would face downwardly, i.e. the card contacts would be there referred to by 22. Thus, the card contacts 22 are those which would be for instance contacted by the contact elements located in the base 4 if the smart card 2 is inserted with the card contacts 22 facing (see FIG. 2) downwardly.

For reasons of simplicity only four card contacts 21, 22 are shown for each group of contact elements, even though in the embodiments shown there are eight contact elements in each the base and the cover.

What is claimed is:

1. A smart card reader, comprising:

a base;

a first group of contact elements fixedly mounted in said base;

a cover placed on top of said base;

a second group of contact elements fixedly mounted in said cover, each of the contact elements of each of said groups comprises
 a termination end adapted to be connected to an electrical circuit; and
 a contacting end adapted to contact one of the card contacts formed by said smart card, said contacting ends of both groups facing towards each other; and connecting means provided for the termination ends of the contact elements in the cover and the base, respectively, said connecting means comprising a printed circuit board having a front end and a rear end and extending from a front end to a rear end of the cover and beyond the rear end of the cover,
 wherein the base is fixed to the cover forming a card receiving slot in an area in which said contacting ends face each other, and into which the smart card can be selectively inserted for contacting at least one of the contact elements mounted in the cover and the contact elements mounted in the base, and
 wherein the termination ends of the contact elements of the first group extend upwardly while the termination ends of the contact elements of the second group extend downwardly and said upwardly extending termination ends are connected to conductive paths of said printed circuit board which lead to said printed circuit board rear end which extends beyond said cover portion rear end, and
 wherein pins are connected to said conductive paths and extend downwardly to the level of the termination ends of said contact elements of the base portion.

2. A smart-card reader of claim 1, wherein said contact elements are soldering contact elements.

3. A smart-card reader of claim 1, further comprising an end position switch located in the cover or the base, said switch being located in the cover or the base, said switch comprising contact elements.

4. A smart-card reader of claim 3, wherein said contact elements and said contact elements of the switch are soldering contact elements.

5. A smart-card reader of claim 1, wherein the contact elements in said cover terminate by means of said connecting means at the level defined by the termination ends of the contact elements in said base.

* * * * *